April 15, 1969
J. A. HOUTMAN
3,439,205
MULTIPHASE ALTERNATING CURRENT DYNAMOELECTRIC MACHINE
STATOR WINDING AND METHOD OF DISPOSING THE
WINDING IN SLOTS OF THE STATOR
Filed March 28, 1966
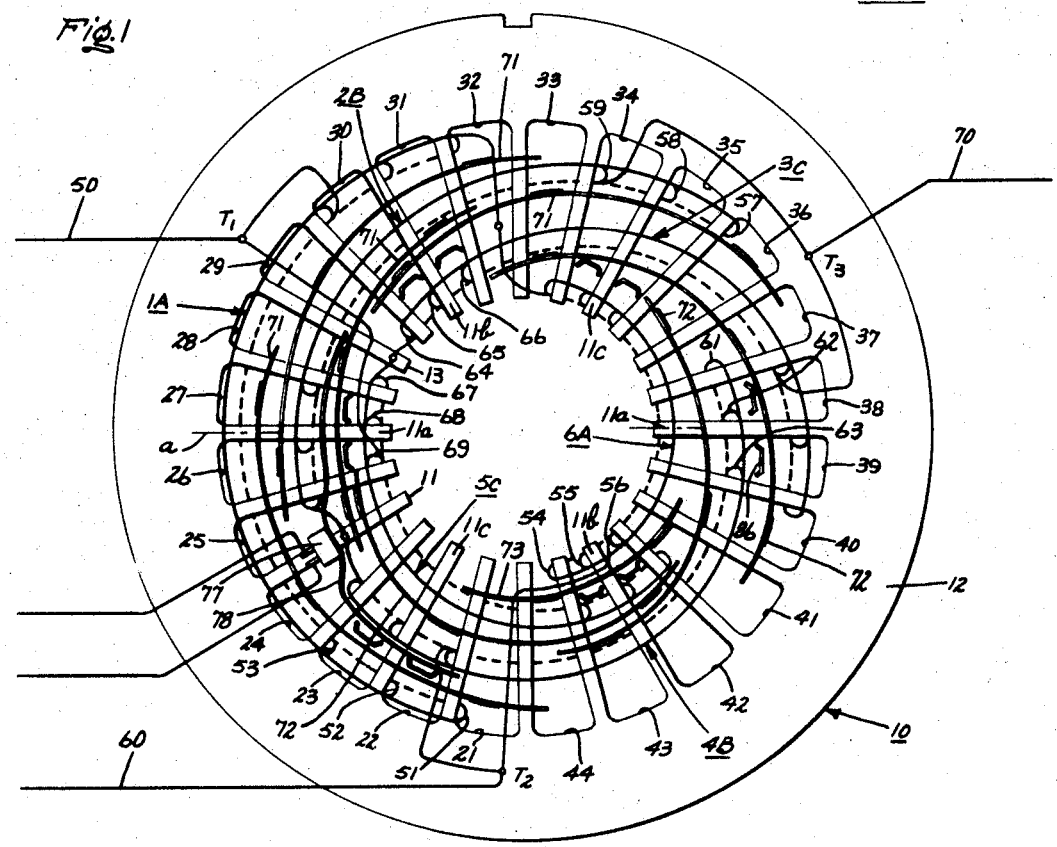
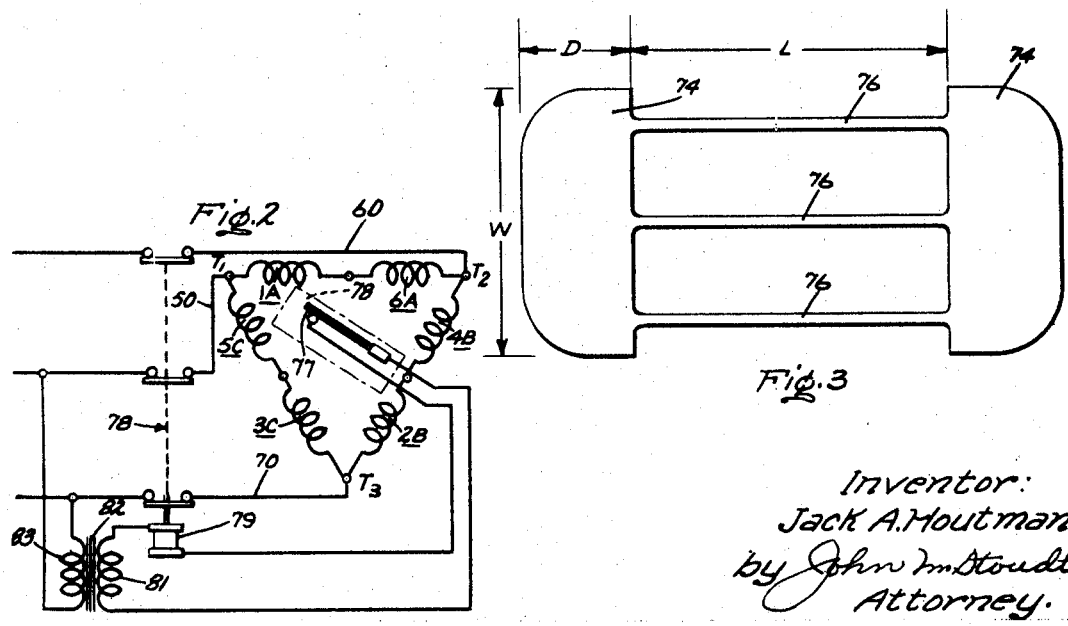
Inventor:
Jack A. Houtman,
by John M. Stoudt
Attorney.

Inventor:
Jack A. Houtman,
by John M. Stoudt
Attorney.

United States Patent Office 3,439,205
Patented Apr. 15, 1969

3,439,205
MULTIPHASE ALTERNATING CURRENT DYNAMOELECTRIC MACHINE STATOR WINDING AND METHOD OF DISPOSING THE WINDING IN SLOTS OF THE STATOR
Jack A. Houtman, Holland, Mich., assignor to General Electric Company, a corporation of New York
Filed Mar. 28, 1966, Ser. No. 537,961
Int. Cl. H02k 17/12
U.S. Cl. 310—180                      10 Claims This invention relates to improvements in multiphase alternating current winding arrangement having a number of pole groups incorporated by stators for such machines, and to an improved method of disposing the pole groups in slots of the stators to form the desired winding arrangement.

In the construction of multiphase alternating current dynamoelectric machines, such as three-phase induction electric motors, it is customary to utilize a stationary member or stator which has a number of angularly spaced apart slots carrying a field excitation winding conventionally divided into a plurality of winding phases equal in number to the number of phases in the power source of polyphase alternating current. In the case of a machine adapted for operation from a three-phase power source, the stator accommodates a field exciting winding conventionally formed of three winding phases, connected either in Y or Δ across the three-phase power source. Each winding phase in turn comprises two or more so-called "pole groups" composed of two or more coils connected in circuit with one another.

In recent years, the use of concentric winding arrangements in the United States has steadily increased in connection with polyphase induction electric motors, due at least in part to the factors explained in the Donald P. Strang et al. Patent No. 2,947,894 issued Aug. 2, 1960 and the G. B. Dunn, Jr., Patent No. 2,796,543 granted June 18, 1957. Generally speaking, in a polyphase concentric winding, all coils of a given pole group are concentrically arranged with respect to the same radial polar center on the core, and when all the stator slots have substantially the same configuration and size, the coil sides for the given pole group carried by the slots are theoretically disposed at approximately the same radial distance from the axial center of the central stator bore. These interrelationships are illustrated in the Dunn, Jr. patent mentioned above.

One practical difficulty or problem in the completely satisfactory use of such polyphase concentric winding arrangements concerns the tendency for conductor end turn portions, which project axially beyond the end faces of the stator core, of outermost coils in adjacent pole groups to touch and experience as much as line-to-line voltage at that location. This voltage between turns, if of sufficient magnitude, may appreciably shorten the life expectancy of the insulation covering the individual coil turns or even break down the insulation altogether. This problem is especially serious in two pole polyphase motors where the various pole groups span almost 180 mechanical degrees and have an unusually large mean effective end turn length for the outermost coils disposed near the bore of the core where available space is quite limited.

Another factor which complicates this problem is the desirability of providing more conductor turns in the outermost coil in a given pole group than for the innermost coil of the same pole group in an attempt to approximate a sinusoidal ampere-turn pattern for the operating poles of the motor. This unfortunately produces a large conductor mass for the outermost coils in adjacent pole groups for polyphase concentric windings thereby accentuating the tendency of the outermost adjacent coil end turns to touch one another.

It is also desirable, from the standpoint of performance, to provide a polyphase concentric winding with balanced phase currents. Since the conductor turns of coil sides positioned closer to the bore experience a lower slot leakage reactance than turns of coil sides disposed in the same slots away from the bore, a balance of phase currents in the individual winding phases is particularly difficult to attain, especially in two pole polyphase concentric windings carried in slots of the universally employed and well-known twenty-four slotted stator cores.

It is therefore quite advantageous to retain the desirable features of the polyphase alternating current concentric winding while overcoming the problems mentioned above with its use.

A still further problem is the attainment of these features by a winding arrangement which is capable of being assembled or otherwise disposed in the core slots by a variety of coil winding machines in use today, such as the L. M. Mason machines disclosed in Patents 2,836,204, 2,934,099, and 2,934,280.

Consequently, it is a primary object of the present invention to provide an improved polyphase alternating current dynamoelectric machine winding arrangement, and more specifically, an improved polyphase winding arrangement for electric motor stators which overcomes the problems and incorporates the desirable features mentioned above.

It is another specific object of the present invention to provide an improved yet economical two pole polyphase winding arrangement in which the tendency of coils in adjacent pole groups to touch is minimized while at the same time the desired coil turn distribution and the balance of phase currents may be attained.

It is a further object to provide an improved method of disposing a polyphase winding in the slots of a dynamoelectric machine stator; and a more specific object in this regard is to provide such method which is capable of practice with coil winding equipment as it still furnishes a winding arrangement having at least some of the more important desirable features mentioned heretofore.

In carrying out the invention in one form, I provide an improved multiphase alternating current winding arrangement for dynamoelectric machine stators in which a plurality of winding phases are displaced in phase one from the other on the stator core. Each of the winding phases includes at least two pole groups formed by two or more concentric coils having predetermined numbers of electrical conductor turns, with each coil having first and second conductor side portions accommodated in some of the core slots. End turn portions join these first and second side portions together and project beyond the end faces of the core.

By one aspect of the invention, one of the winding phases includes one pole group in which the end turn portions are originally positioned radially next to the bore of the stator core and another selected pole group for the same winding phase has its end turn portions originally positioned radially next to the yoke section. In addition, the end turn portions in all the pole groups for at least one of the remaining winding phases extend at least partially between end turn portions of adjacent pole groups such that potential engagement of the end turn portions for different pole groups adjacent the bore is minimized. Thus, the tendency of outermost coils in adjacent pole groups to touch and experience as much as line-to-line voltage at the bore is greatly reduced over prior arrangements known to me, even in two-pole polyphase electric motor stators where the various pole groups span approximately 180 mechanical degrees. In addition, it is possible to furnish a winding arrangement in which the outermost coils in a given pole group include more conductor turns than the innermost coils so that a sinusoidal ampere-turn pattern for the operating poles of the motor may readily be approximated without adversely affecting the tendency of the outermost coils near the bore to be out of contact with one another in adjacent pole groups. Another beneficial feature of the foregoing is the ability to balance phase currents in the individual winding phases.

This winding arrangement has the further advantageous feature, when applied to polyphase motors having three phases, of allowing temperature responsive means, such as a thermal protector unit, to be located in heat exchange relation with end turn portions of at least one pole group for each of the winding phases. Consequently, control of winding excitation may easily be effected in response to a predetermined adverse temperature condition in any one of the three winding phases.

By a further aspect of the present invention, I provide an improved method of disposing the winding phases in the slots of the stator which may be readily practiced by existing winding equipment and permits proper placement of end turn electrical insulators between end turn portions of adjacent pole groups. Initially, one pole group of a first winding phase is disposed in the core slots at one location and thereafter pole groups, other than the another selected pole group in the first winding phase, are disposed in slots at locations electrically displaced from the one pole group. The last pole group disposed in the slots is the selected pole group of the first winding phase such that it is displaced by angle $\phi$ (e.g., approximately 180 electrical degrees) from the one location of the one pole group to complete the winding arrangement.

The subject matter which I regard as my invention is particularly pointed out and distinctly claimed in the concluding portion of this specification. My invention itself, however, both as to its organization and method of operation, together with further objects and advantages thereof may best be understood by reference to the following description taken in connection with the accompanying drawings which illustrate the preferred embodiment of the invention.

In the drawings:

FIGURE 1 is a schematic view of a two-pole three-phase induction electric motor stator incorporating the preferred embodiment of the present invention;

FIGURE 2 is a schematic diagram of one type of electrical circuit which can be employed in the practice of the present invention as illustrated in FIGURE 1;

FIGURE 3 is a plan view of one type of winding end turn electrical insulator revealed schematically in FIGURE 1 which may be advantageously employed between adjacent end turn portions;

Figure 5:
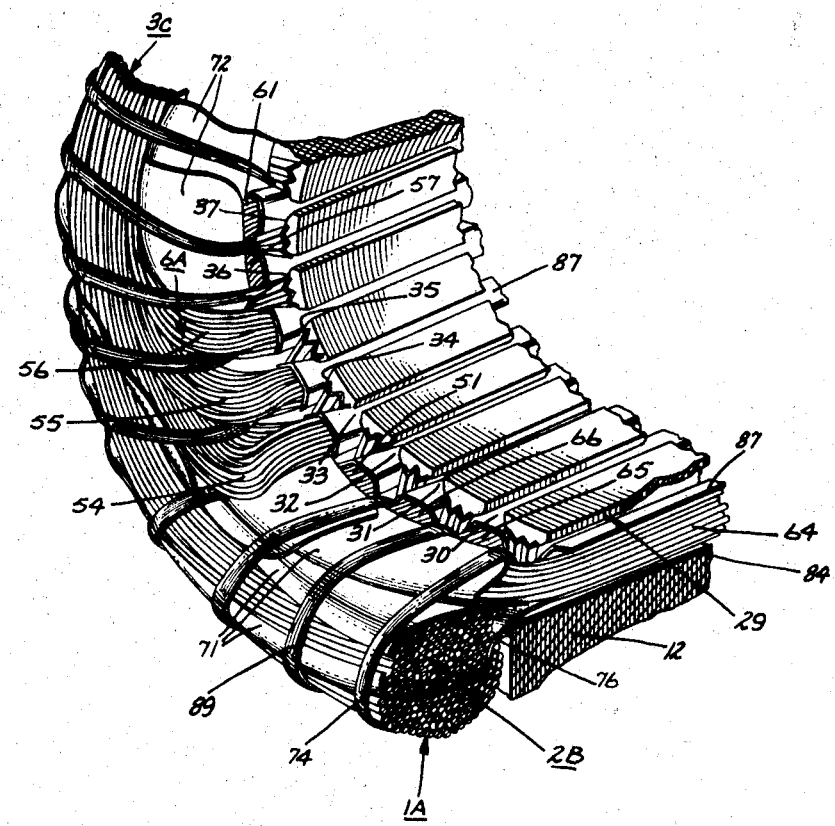
Figure 4:
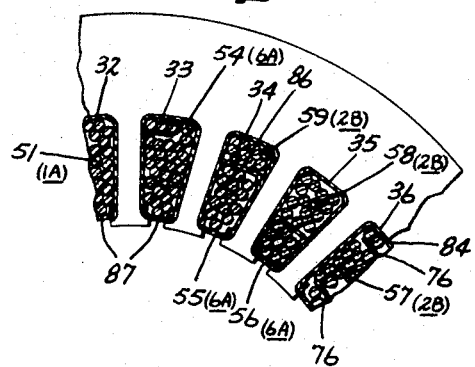

FIGURE 4 is a fragmentary view, partly in cross-section, showing the distributed coil arrangement of three preselected adjacent slots of the stator schematically shown in FIGURE 1; and FIGURE 5 is a fragmentary view in perspective of a part of the stator schematically represented in FIGURE 1 to show the way in which the end turn portions of some of the pole groups are electrically separated from each other.

Referring now to the drawings in more detail, the preferred embodiment of the present invention is applied to a primary member or stator 10 of a multi-phase alternating current dynamoelectric machine, such as a three-phase induction electric motor stator. The magnetic core of the stator is formed in the usual way from a stack of aligned laminations to provide a plurality of angularly spaced apart teeth sections 11 integrally joined together at one end by a yoke section 12. The teeth sections terminate at their radially inner ends to define a cylindrical bore 13 for receiving a secondary member or rotor (not shown), which may be of the well-known squirrel cage induction type. For purposes of explaining one form of my invention, the stator conventionally incorporates the widely used twenty-four, evenly spaced apart, identically shaped, winding accommodating slot construction. Each slot extends radially outward from the bore in the standard fashion, with the slots being consecutively numbered from 21 through 44 inclusive in FIGURE 1.

In the illustrated embodiment, a first winding phase has two-pole groups 1A, 6A respectively formed by concentric coils 51, 52, 53 and coils 54, 55, 56 spanning 11, 9, and 7 teeth sections, with teeth sections 11a being in radial pole center for each of the two-pole groups. Thus, pole groups 1A and 6A are electrically displaced from each other on the core by angle $\phi$ which is 180 electrical degrees. A second winding phase has two pole groups 2B, 4B displaced in phase from the first winding phase, with each of these pole groups also being formed by three concentric coils 57, 58, 59 and 61, 62, 63, the coils being concentric with respect to teeth sections 11b. In a like fashion, the third winding phase has two pole groups 3C, 5C concentric about teeth sections 11c. The coils are respectively numbered 64, 65, 66 for pole group 3C and 67, 68, 69 for group 5C. The three phases are connected to a suitable three-phase alternating power source (not shown) by lines 50, 60, 70 which are connected to the various phases at $T_1$, $T_2$, and $T_3$. The phases may be connected across the power source either in Y or $\Delta$. Moreover, although pole groups in a given phase are shown as being in series to provide a balanced slot leakage reactance, to be brought out more clearly hereinafter, they may be connected in parallel and the winding arrangement will still incorporate a good, but not optimum, balance.

Turning now to the interrelationships of the various coil groups on the stator core, in the illustrated exemplification it will be observed from FIGURE 1 that of the three phases, only the first phase has two of its pole groups with end turn portions projecting beyond the associated end face of the core, at least originally before they are pressed into a final position shown by FIGURE 5 respectively adjacent the yoke section 12 (pole 1A) and the bore 13 (pole 6A). At least one of the remaining phases has a part of the end turn portions for all of the pole groups originally disposed between adjacent pole groups. For instance, the end turn portions of pole group 2B are between pole 1A and either poles 3C or 5C. Pole group 4B has one part of the end turn portions between poles 1A, 5C and the other end between 6A, 3C. For two pole stators, the third phase also has end turn portions between adjacent pole groups such that poles 3C and 5C cross radially behind pole 6A, away from the bore. Consequently, the end turn portions of coil group 6A near the bore are isolated and out of potential contact with the end turn portions located next to the bore of pole groups 3C, 5C. In addition, it will be observed from FIGURES 1 and 5 that at least a part of the end turn portions in every one of the pole groups for the three phases is exposed from the end turn mass so that air or other coolant may be directed into contact with the exposed parts to improve the transfer of heat away from the winding phases. This, in turn, results in a better winding temperature balance for the winding arrangement.

The tendency of end turn engagement and potential line to line voltage between outermost coils in the pole groups near the bore is further minimized by the advantageous use of a number of end turn electrical insulator members 71, 72, 73. These members are preferably formed from suitable, relatively thin electrically insulating material, such as a sheet of resilient polyethylene terephthalate, having two spaced apart generally planar sections 74 integrally joined together by a number of legs 76. FIGURE 3 illustrates the general configuration of members 71, 72. Sections 74 of the members are in overlapping relation on either side of the stator core, adjacent the end faces, the original positions being revealed schematically in FIGURE 1 and in final positions after press-back of the end turns being seen in FIGURE 5 where the sections are wrapped partially around the individual end turn portions. In actual practice, for a stator core having a bore diameter of 3.1 inches, an outside diameter of 6.25 inches and a stack length of 4.2 inches (nominal dimensions). The insulator members 71, 72, and 73 were respectively provided with a width W of 4.27, 4.79, and 3.48 inches. The transverse dimension D and length of legs 74 were 1.75 inches and 5.18 inches for all members, the dimensions being nominal. These dimensions permitted the flexible sections 74 to be bent and wrapped during press-back of the windings, away from the bore, as seen in FIGURE 5 to assist in insulating the end turn portions between adjacent pole groups.

As noted previously, another advantageous feature of the present invention is the possible utilization of thermal protection of the type in which a protective means may be mounted directly in the winding end turn portions so that it is capable of responding directly to the winding temperatures of all of the winding phases. By way of illustration, in the exemplification the protective means includes a temperature sensor in the form of a bimetallic switch device 77 having attached thereto a metal strip or fin 78, the device being of the type shown and described in Patent No. 2,909,719 issued to C. A. Dubberley on Oct. 20, 1959. The fin is placed in heat exchange relationship with the switch housing and winding pole groups 2B, 4B, 1A, and 5C. Thus, it is effective to sense a temperature rise in any one or more of the three winding phases such that when the temperature in the region of the device exceeds a predetermined minimum, the switch contacts will be opened and will remain open until the temperature sensed again returns to a normal or safe temperature condition. It will be recognized that heat transfer between the adjacent poles can be regulated to some extent by adding insulation layers between the fin and the adjacent pole group which will have an effect of decreasing or impeding the heat transfer to the fin at that region. From the above discussion, it will be appreciated that the specific structure of the protective means from no part of the present invention and any device may be used without departing from this aspect of the present invention.

In FIGURE 2 of the drawings there is shown one type of control circuit which may be used with the illustrated thermal protective device. This control includes the connection of a relay switch 78 in each of the lines 50, 60, and 70 and a relay coil 79 wired in series with the protective thermal switch 77, the coil 79 being energized by means of a secondary coil 81 of a transformer 82. The primary winding 83 of the transformer is connected across two phases in the power line. During normal operation of the stator, relay 78 is closed due to the energization of the relay coil 79 by means of the control circuit, including the secondary winding 81 of the transformer 82. Therefore, so long as the temperature sensed by the switch 77 and its associated fin is within the designed, operating temperature safe limits of the protective arrangement, switch 77 will remain closed. However, when the temperature condition in the winding end turns in any one or more of the phases becomes heated and there is an abnormal rise in the temperature, the bimetal switch 77 will open with the resultant deenergization of relay 78 to cause the relay switches 78 to open and break the power circuit to the stator windings. This circuit will remain open until the protective device once again senses a safe operating temperature.

Returning now to a consideration of the interrelationships of the winding phase coils on the core and in particular to FIGURES 1, 4, and 5 it will be seen that the 24 slotted core of the exemplification has preselected slots which accommodate conductor side portions of only the outermost coils for the various pole groups. On the other hand, the intermediate and innermost coils of each of the pole groups share slots. Suitable cuffed electrical insulating slot fingers 84 are used to insulate the coil side portions and part of the end turns from the stator core slot walls and end faces while conventional coil separators 86 are used to electrically separate coil side portions contained in the same slots (see FIGURE 4). Wedges 87 close the slot entrance adjacent the bore in the well-known fashion. Consequently, in spite of the desirable end turn interrelationships previously mentioned, it is possible, with the present invention, to choose the proper number of turns in each coil of a given pole group to approximate a sinusoidal ampere-turn pattern. For instance, in a stator for a polyphase electric motor rated at ten horsepower 3450 r.p.m., 230 volts, 60 cycle and having the core dimensions previously mentioned, the desired pattern was obtained employing 23, 14, and 9 turns respectively for outermost, intermediate, and innermost coils in each pole group. The wire was copper, having a resistance per phase at 25° C. of 0.408 ohm and a line to line resistance of 0.272 ohm (nominal).

It should be additionally noted from FIGURE 1 that the slot leakage reactance in all three phases is balanced since each phase has two pole sides positioned in the yoke region of the stator slots and two pole sides located toward the bore region of the stator slots. The slot leakage reactance is exactly balanced, at least in theory for series connected poles, and has a much better balance than present arrangements known to me for parallel connected poles. This permits the attainment of balance phase currents and the use of less winding material for a given temperature rise.

Turning now to another aspect of the present invention, the formation of the winding arrangement already discussed may readily be accomplished by an improved method of disposing or forming the pole groups in the slots of the core. The terms "disposing" or "forming" as used herein is meant that the coils in the pole groups may be inserted as preformed coils into the slots, either by hand or automatically, as with the equipment shown in the Mason Patent No. 2,934,099. In the alternative, the conductor turns may be wound directly into the slots to form the coils, for example, in the manner revealed by the Mason Patent 2,934,280.

Initially, pole group 1A is disposed in the slots of the core concentric relative to its associated tooth 11a, the radial pole center denoted by the broken lines a, and two end turn insulator members 71 are positioned in the manner shown in FIGURE 1. The coils of pole group 2B in the second winding phase are then disposed with a radial center at tooth 11b 60 electrical degrees away from center a (in a clockwise direction as viewed in FIGURE 1). Two more insulator members 71 are placed radially beneath pole group 2B and coil separators 86 are provided in slots 30, 31. The third winding phase coil group 3C is then disposed in the slots concentrically around tooth 11c at 120 electrical degrees from pole center a, coil separators are placed in slots 34, 35, 38, and 39, and an end turn insulator member 72 is assembled radially inward of group 3C as revealed in FIGURE 1.

At this time, the next pole group in the same winding phase as group 1A is skipped, that is group 6A, and coil group 4B of the second winding phase is formed about tooth 11b approximately 240 electrical degrees from location a. Two end turn insulator members 72 are placed radially below pole groups 2B, 4B, in overlapped relation along with two coil separators in slots 26, 27. Pole group 5C of the third winding phase is then provided in the slots concentric with tooth 11c at an angle of 300 electrical degrees from the radial center of pole 1A, after which two slot coil separators are placed into slots 42, 43 and end turn insulator member 73 is arranged in position radially inward on one side of 5C.

Finally, to complete the winding arrangement, pole group 6A of the first winding phase which was temporarily omitted is formed in the slots 180 electrical degrees away from polar location a and even though the side portions of the outermost coils for groups 1A and 6A of the same phase are contained in adjacent slots 32, 33 as well as slots 21, 44 the end turn portions are effectively separated physically one from the other. Further, with respect to the end turn portions of outermost coil 54 for pole group 6A, the portions are also isolated from any of the other end turns.

Once the windings are in place on the arc, wedges 87 may be inserted into the slots to close the slot entrances in the region of the bore, the end turns pressed back away from the bore and compacted to the final shape shown in FIGURE 5, and if desired, cord 89 may be wound around the compacted mass of end portions to retain them away from the bore.

Thus, it will be seen that in connection with the illustrated embodiment, pole group 1A of the first winding phase is disposed at one location (about $a$) in slots of the cord and thereafter other pole group 2B, 3C, 4B, and 5C, other than selected pole group 6A of the same winding phase as pole group 1A, are disposed in the slots at the proper electrical displacements with respect to one another and to group 1A. Moreover, the slected pole group 6A, which was previously skipped in the placement, is finally displaced 180 electrical degrees from pole group 1A in the same phase at the desired location to complette the method of formation.

As is evident from the foregoing, the present invention has a number of advantages. For example, the tendency for conductor end turn portions which project axially beyond the end faces of the stator core of outermost coils in adjacent groups to touch and experience line to line voltage in that location is minimized. In addition, the number of turns may be chosen for the individual pole groups so that the operating poles of the motor may approximate a sinusoidal ampere-turn pattern. Even though this choice may produce a large conductor turn mass for the outermost coils in the adjacent pole groups, and the coils of the different phases may be wound in the same arbors to balance resistances, the tendency to touch will not be appreciably affected. Furthermore, a balance of phase currents in the individual winding phases may be achieved with the balancing of slot leakage reactance, and smaller wire with less material may be employed to reduce slot space and end turn factors. Another advantageous feature resides in the good heat transfer characteristics exhibited by the end turn portions and the permissive use of a winding protective means which may be mounted directly on the winding end turns. This means may be made responsive to temperature conditions of all three phases, if so desired with minimum of expense. Furthermore, improved utilization of end turn insulator members for electrical insulation purposes can be achieved and their placement in the stator core at the proper locations easily accomplished. These benefits as well as others enumerated heretofore are economically obtained even when incorporated in the manufacture of two-pole, three-phase winding arrangements.

It will be appreciated that while I have described the preferred embodiment as applied to a three or polyphase winding arrangement having three concentric coils for each pole group, the principles enunciated above regarding the present invention are equally applicable to other coil deployment, core slot structure, and/or multiphase winding arrangements. By way of illustration, the present invention may readily be incorporated in a three-phase, four pole winding arrangement using the well-known and desirable thirty-six equally spaced apart, slotted stator core. In one form, twelve pole groups include two concentric coils which respectively span 8 and 6 teeth, with the groups being placed on the core in the following sequence: 1A, 2B, 3C, 4B, 5C, 6A, 7B, 8C, 9A, 10B, 11C, and 12A (the letters referring to the phase). Each pole group in a given phase would be 180 electrical degrees apart, with pole groups 1A and 12A having basically the same relative relationships as groups 1A and 6A in the two pole exemplification. Further, adjacent pole groups of different phases would be 60 electrical degrees from one another. Like the illustrated exemplification, all of the pole groups in phase B would have at least part of their end turn portions extending between adjacent pole groups. Thus, potential engagement of the portions at the bore in the four pole winding arrangement, including pole group 12A located next to the bore, would be minimized, and improved ventilation of the portions achieved. At the same time, certain slots would accommodate only coil side portions of outer coils in the individual pole groups without sharing the slot with another coil to permit the attainment, by proper choice of conductor turns of the desired ampere-turn pattern.

Consequently, while I have shown and described what at present is considered to be the preferred embodiment of my invention in connection with a polyphase, two-pole stator winding arrangement in accordance with the patent statutes, it will be obvious to those skilled in the art that changes and modifications may be made without departing from the true scope and spirit of my invention and I intend to cover in the following claims all such equivalent variations as fall within the invention.

What I claim as new and desire to secure by Letters Patent of the United States is:

1. In a multiphase induction electric motor, a stator comprising a primary core member having end faces, a yoke section and a number of teeth sections forming coil accommodating slots and a bore; a plurality of winding phases displaced in phase from one another carried by said core; each of said winding phases including at least two pole groups each formed by at least two coils having predetermined numbers of electrical conductor turns; said coils each having first and second conductor side portions accommodated in some of said slots and end turn portions, joining said first and second side portions together, projecting beyond said core end faces; one of said winding phases including one pole group in which the end turn portions thereof are originally positioned radially next to the bore and another pole group in which the end turn portions thereof are originally positioned radially next to the yoke section; and end turn portions in all of the pole groups of at least one of the remaining winding phases of said plurality extending at least partially between end turn portions of adjacent pole groups, whereby potential engagement of end turn portions of different pole groups adjacent the bore is minimized.

2. The stator of claim 1 in which some of said slots accommodate preselected coil side portions of only one coils to permit that one coil to include a greater predetermined number of conductor turns than included in certain other coils.

3. The stator of claim 1 in which a number of electrical end turn insulators are positioned between end turn portions of said adjacent pole groups.

4. In a polyphase induction electric motor, a stator comprising a primary core member having end faces, a yoke section, and a number of teeth sections forming coil accommodating slots and a bore; and first, second and third winding phases displaced in phase one from the other carried by said core; each of said winding phases including at least two pole groups each formed by at least two concentric coils, with an outermost coil in each pole group spanning the most teeth sections for that pole group; said concentric coils having first and second conductor side portions accommodated in preselected slots, with some of said preselected slots accommodating conductor side portions of only said outermost coils; coil end turn portions joining said first and second side portions together and projecting beyond said end faces; and only said first winding phase including both a first pole group having part of its coil side portions along with the end turn portions, located next to said part, being positioned adjacent said bore, and a second pole group having part of its coil side portions along with the end turn portions, located next to the associated coil side portion part, positioned adjacent said yoke section.

5. The stator in claim 4 in which temperature responsive means is mounted in heat exchange relation with end turn portions of at least one pole group in each of said first, second, and third winding phases for controlling excitation of the winding phases in response to a predetermined temperature condition in any one of said winding phases.

6. The stator of claim 4 in which one coil side portion in the outermost coils for said first and second pole groups are respectively accommodated in adjacent slots of the core.

7. A method of forming a multiphase multipole winding arrangement having at least first and second winding phases, displaced in phase, carried by slots of a stator core; each of the winding phases including at least two pole groups having two or more coils; the method comprising the steps of: disposing one pole group of the first winding phase at one location in certain slots of the core; disposing other pole groups, other than a selected another pole group in said first winding phase, in the slots at locations electrically displaced from said one pole group; and forming the selected another pole group of said first winding phases in slots at a final location electrically displaced angle $\phi$ from said one location to complete the winding arrangement.

8. The method of claim 7 in which the formation of the selected another pole group of the first winding phase disposes a side portion of a coil of said selected another pole group in a slot adjacent to a slot accommodating a side portion of a coil of a pole group in the same winding phase and angle $\phi$ is approximately 180 electrical degrees.

9. A method of forming a polyphase winding arrangement having first, second, and third winding phases displaced in phase carried by slots of a stator core, each of the winding phases including at least two pole groups having two or more concentric coils; the method comprising the steps of: disposing the coils of one pole group for the first winding phase at a first location in slots of the core; forming one pole group for each of the second and third winding phases in predetermined electrical spaced relation with respect to the one pole group of the first winding phase; disposing the remaining pole groups, other than a selected another pole group of said first winding phase, in the slots of the core at locations other than said first location; and forming the selected another pole group of said first winding phase in the slots in an electrically spaced relation with said first location to complete the winding arrangement.

10. The method of claim 9 in which coil side portions of an outermost coil in each of the winding phases are disposed in slots having no other coils therein.

References Cited

UNITED STATES PATENTS

| | | | |
|---|---|---|---|
| 1,849,263 | 3/1932 | Apple | 310—180 |
| 2,367,079 | 1/1945 | Wiest | 310—180 |
| 2,998,540 | 8/1961 | Phillips | 310—260 |
| 2,465,820 | 3/1949 | Sharrow et al. | 310—260 |

MILTON O. HIRSHFIELD, Primary Examiner.

L. L. SMITH, Assistant Examiner.

U.S. Cl. X.R.

310—260